United States Patent [19]

Iwasaki

[11] Patent Number: 5,497,215
[45] Date of Patent: Mar. 5, 1996

[54] CAMERA PHOTOMETRY SYSTEM

[75] Inventor: Hiroyuki Iwasaki, Kawasaki, Japan

[73] Assignee: Nikon Corporation, Tokyo, Japan

[21] Appl. No.: 384,355

[22] Filed: Feb. 2, 1995

Related U.S. Application Data

[63] Continuation of Ser. No. 205,395, Mar. 3, 1994, abandoned.

[30] Foreign Application Priority Data

Mar. 30, 1993 [JP] Japan ..................... 5-095203

[51] Int. Cl.$^6$ ........................ G03B 7/08
[52] U.S. Cl. ........................ 354/432
[58] Field of Search .................. 354/402–409, 354/432, 430

[56] References Cited

U.S. PATENT DOCUMENTS

| | | | |
|---|---|---|---|
| 4,821,074 | 4/1989 | Nakai et al. | 354/402 |
| 4,912,495 | 3/1990 | Ishikawa et al. | 354/432 X |
| 4,929,824 | 5/1990 | Miyazaki | 354/432 X |
| 4,998,127 | 3/1991 | Bell | 354/432 X |
| 5,008,698 | 4/1991 | Muramatsu et al. | 354/432 X |
| 5,249,015 | 9/1993 | Takagi et al. | 354/432 X |
| 5,302,997 | 4/1994 | Cocca | 354/432 |

FOREIGN PATENT DOCUMENTS

4-310930  11/1992  Japan.

*Primary Examiner*—Russell E. Adams
*Attorney, Agent, or Firm*—Oliff & Berridge

[57] ABSTRACT

The invention provides a camera photometry system that uses accumulation-type photometry elements to output photometric information related to the brightness of the subject field. The invention eliminates the smear phenomenon caused by the effects of the brightest parts of the subject field while also appropriately measuring the light of the major subject in the subject field. The invention is a camera photometry system equipped with a photometry mechanism which measures light using accumulation-type photoelectric elements by dividing the subject field into multiple photometry regions, and which outputs photometry information related to the brightness of the subject field, with the photometry element being equipped with a photoelectric mechanism for converting light into electricity which is stored and a transmission mechanism for transmitting the electric charge which is stored by the photoelectric mechanism. The system is configured so that the transmission mechanism transmits the electric charge from the top to the bottom with respect to the vertical direction of the subject field.

8 Claims, 8 Drawing Sheets

CAMERA PHOTOMETRY SYSTEM

This is a Continuation of application Ser. No. 08/205,395 filed Mar. 3, 1994, now abandoned.

BACKGROUND OF THE INVENTION

1. Field of the Invention

This invention relates to a camera photometry system that outputs photometric information related to the brightness of the subject field using accumulation-type photometry elements.

2. Description of Related Art

Formerly, this type of camera was the kind noted in the public disclosure of Japanese Laid-Open Publication No. 4-310930. The device measures light by dividing the subject field into multiple regions, detects information related to the multiple brightness readings and information related to the various hues, divides the subject field into groups based on the information, and calculates an appropriate exposure value.

When accumulation-type photometry elements are used in the device described above, if the accumulated charge passes through the bright regions of the screen when it is transmitted to the outside, a smear phenomenon is created because excess charge mixes with the data. In addition, when accumulation type photometry elements are used, the aperture ratio of the photoelectric parts declines, but conventional devices do not take these items into consideration, resulting in the problem that photometry errors become large.

SUMMARY OF THE INVENTION

The purpose of this invention is to provide a camera photometry system that eliminates the smear phenomenon caused by the effects of the brightest parts of the subject field, and which also appropriately measures the light of the major subject in the subject field.

The invention is a camera photometry system equipped with a photometry mechanism which measures light using accumulation-type photoelectric elements by dividing the subject field into multiple photometry regions, and which outputs photometry information related to the brightness of the subject field, with the photometry element being equipped with a photoelectric mechanism for converting light into electricity which is stored and a transmission mechanism for transmitting the electric charge which is stored by the photoelectric mechanism. The system is configured so that the transmission mechanism transmits the electric charge from the top to the bottom with respect to the vertical direction of the subject field.

In addition, the invention is a camera photometry system equipped with a photometry element that measures light by dividing the subject field into multiple photometry regions and with a photometry optics system that guides light rays from the subject field to the photometry element, with the photometry element being equipped with a photoelectric mechanism for converting light received into electricity which is stored and a transmission mechanism for transmitting the electric charge which is stored by the photoelectric mechanism, the photoelectric mechanism being positioned on the optical axis of the photometry optics system.

In this case, the photometry element is equipped with photoelectric elements for multiple hues in each of the photometry regions in order to measure light by dividing the subject field into multiple hues. Of the photoelectric elements, the photoelectric element for the hue with spectral sensitivity nearest the human visibility curve is positioned on the optical axis of the photometry optical system.

With the invention, when the charge accumulated in the photometry elements is transmitted to the outside by means of the transmission mechanism, the charge is transmitted from the top to the bottom with respect to the subject field, that is to say, from the upper side to the lower side, and because the charge from the lower side is transmitted without passing through the relatively bright upper side, it is possible to suppress the smear phenomenon.

In addition, because, with the invention, the photometry element is positioned so that the photoelectric elements fall on the optical axis of the photometric optical system, it becomes possible to accurately measure the light from the subject on the optical axis, where the major subject information has the greatest probability of existing. Moreover, it becomes possible to accurately measure light because the photoelectric element for the hue having spectral sensitivity nearest the human visibility curve is positioned on the optical axis of the photometry optical system.

DETAILED DESCRIPTION OF PREFERRED EMBODIMENTS

Figure 1:
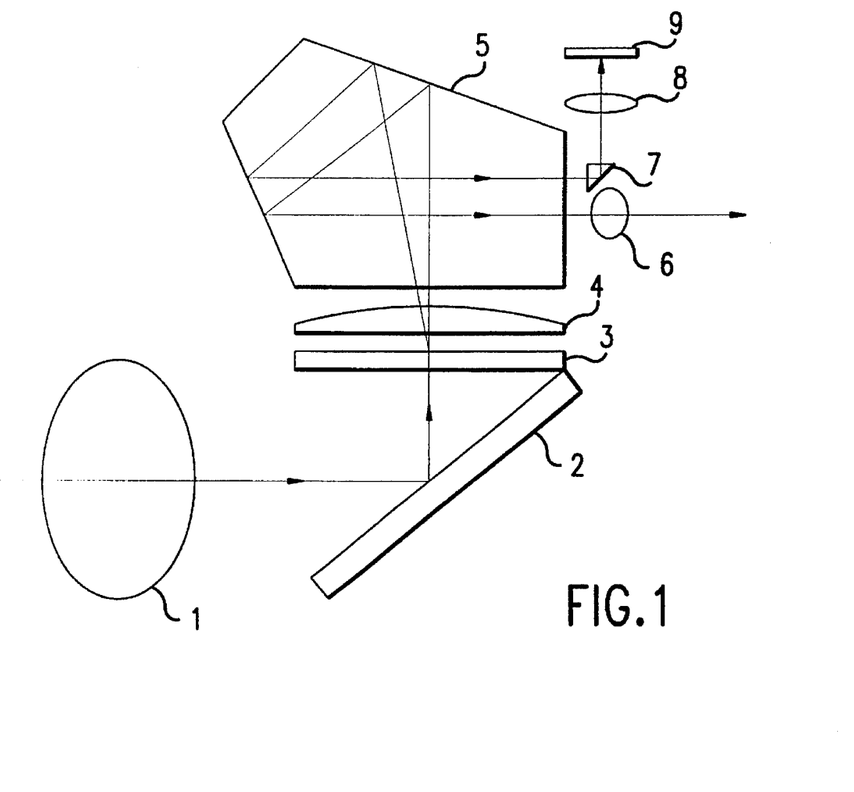
FIG. 1 is a block diagram of an optical system showing the embodiment of the invention.
Figure 2:
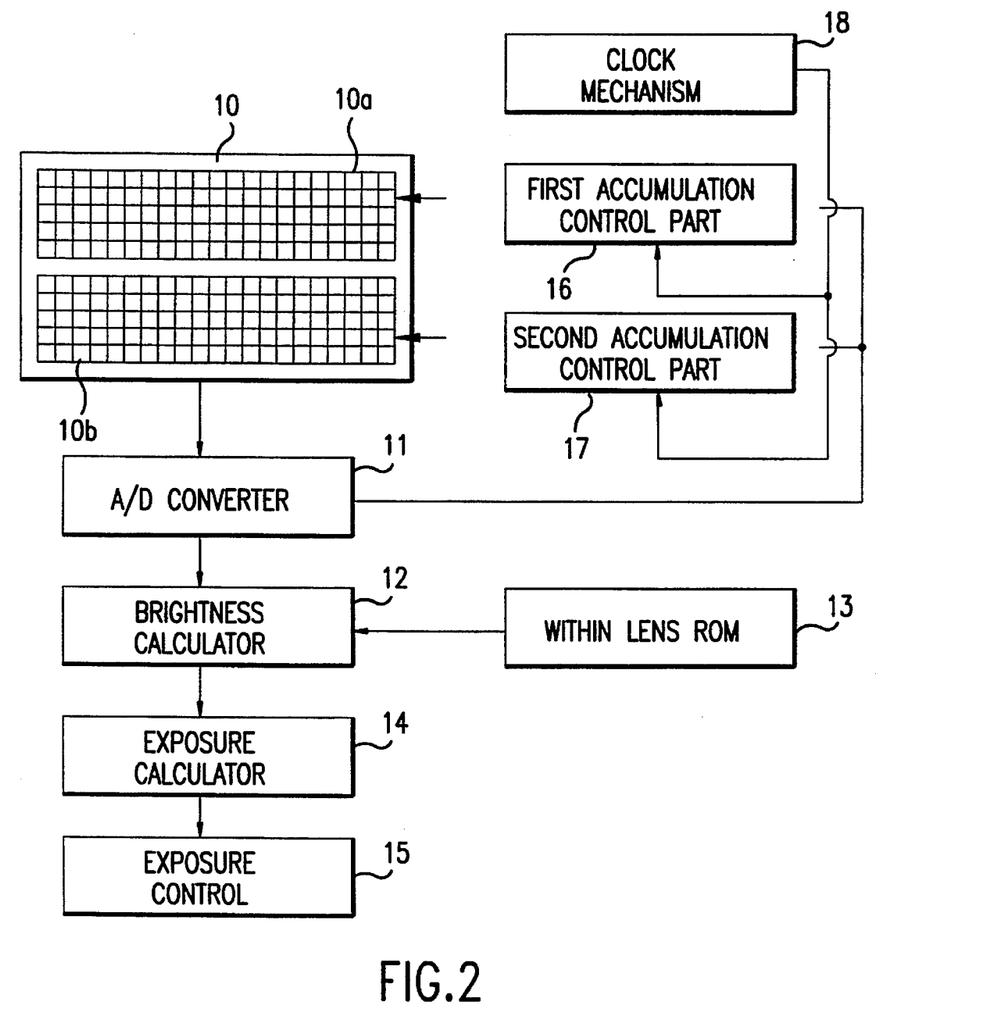
FIG. 2 is a block diagram of a circuit system showing the embodiment of the invention.

FIGS. 1 and 2 are block diagrams showing the optical systems and circuit systems of the first embodiment of a camera photometry system using the invention.

The optical system, shown in FIG. 1, is structured so that light rays passing through the photography lens 1 are reflected by a quick return mirror 2, creating an image on a diffusion screen 3, and reach the eye of the photographer by passing through a condenser lens 4, a pentagonal prism 5 and the eyepiece lens 6. In addition, some of the light rays that formed the image on the diffusion screen 3 pass through the condenser lens 4, the pentagonal prism 5, a photometry prism 7 and a photometry lens 8 to form an image on a photometry element 9.

Figure 3:
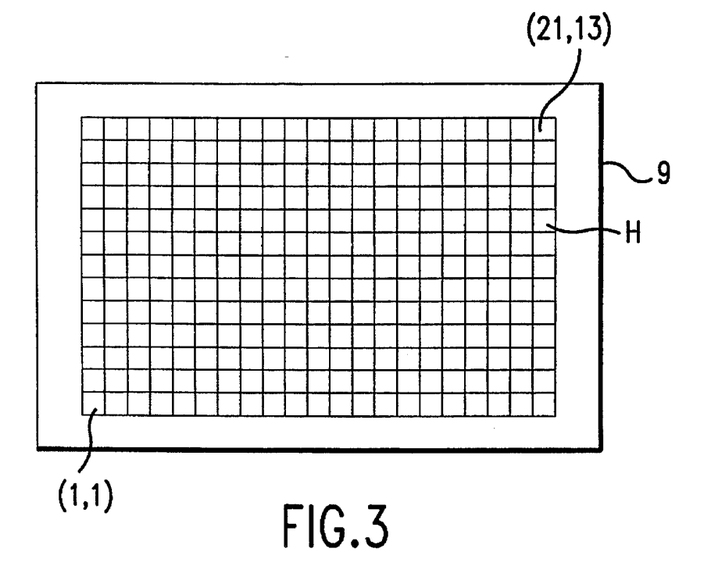
FIG. 3 is a configuration diagram showing the embodiment of the photometry element shown in FIG. 1.
Figure 4:
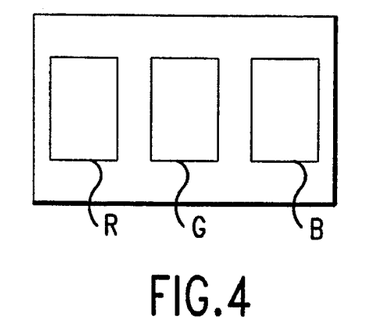
FIG. 4 is a configuration diagram of the photometry regions shown in FIG. 3.

The photometry element 9 is made up of 273 photometry regions dividing the subject field into 13 rows horizontally and 21 columns vertically, as shown in FIG. 3, and a number is associated with each of these photometry regions, with the photometry region in the lower left corner being (1,1) and the photometry region in the upper right corner being (21,13). In addition, each of the photometry regions is divided into the primary colors red (R), green (G), and blue (B), as shown in FIG. 4, so that 273 photometry values for each of the colors red, green and blue is output from the photometry element 9.

The circuit system, shown in FIG. 2, is a system that calculates the optimal exposure value based on the photometry values measured by the photometry element 9 and controls the exposure based on the optimal exposure value. The circuit system is equipped with a photometry part 10 that includes the photometry element 9 described above. The photometry part 10 is divided into a first photometry area 10a and a second photometry area 10b and is structured so that each of the first and second photometry areas 10a, 10b is independently controlled by a control mechanism as will be described hereafter.

The photometry values that are output from the photometry part 10 are converted into digital signals by an A/D converter 11, and the digital signals are output to the brightness calculator 12 as digital photometry information. The brightness calculator 12 reads information about the positioning of the exit pupil and the F release value of the photography lens from a lens ROM 13 mounted inside the photography lens, and calculates a brightness value for each photometry region based on this information and the digital photometry information. An exposure calculator 14 calculates the optimal exposure value based on the output of the brightness calculator 12 and an exposure controller 15 controls the exposure in accordance with the optimal exposure value through full depression of a shutter release button (not shown in figure).

The photometry information from the photometry regions which was converted to digital signals by the A/D converter 11 is supplied to a first accumulation control part 16, which controls the accumulation time of the first photometry area 10a, and to a second accumulation control part 17, which controls the accumulation time of the second photometry area 10b. A description of the first and second accumulation control parts 16,17 will be given hereafter.

In addition, the photometry system is equipped with a clock mechanism 18 designed as a timer to keep track of the current date and time. Date information from the clock mechanism 18 is supplied to the first and second accumulation control parts 16,17 as information showing the date and time the photograph is taken, and is used in the process that sets an initial accumulation time that will be described hereafter.

Figure 5:
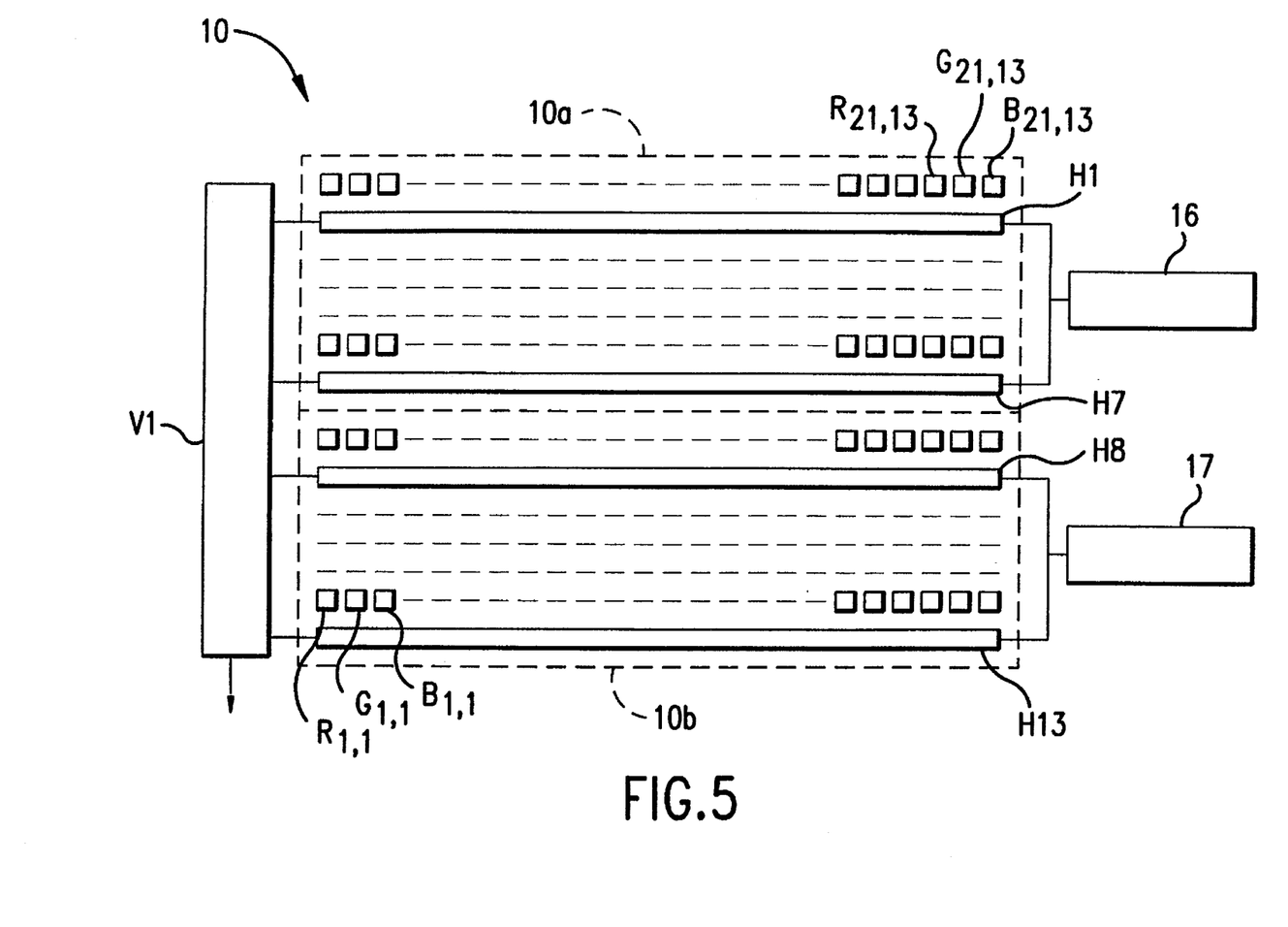
FIG. 5 is a detailed configuration drawing of the photometry part shown in FIG. 2.

FIG. 5 is a diagram showing further details of the structure of the photometry part 10. As described above, because each of the 273 individual photometry regions in the photometry element 9 is configured to separately measure the amount of the three primary colors red, green and blue in the photometry part 10, accumulation-type photoelectric elements Rij,Gij,Bij (where i=1, 2, . . . , 21; j=1, 2, . . . , 13) are positioned in the horizontal direction in positions corresponding to each photometry region.

In addition, horizontal transmission registers H1,H2 . . . , H13 are situated at each of the 13 rows of photoelectric elements 9 and the output end of each of the horizontal transmission registers H1–H13 is connected in parallel to a vertical register V1.

Because the photometry part 10 is divided into a first photometry area 10a and a second photometry area 10b as described above, registers H1–H7 are registers for the first photometry area 10a and registers H8–H13 are registers for the second photometry area 10b. The device is configured so that the starting and stopping of accumulation in each of the accumulation-type photoelectric elements in the respective areas is controlled independently by the first accumulation control part 16 and the second accumulation control part 17, respectively.

Next, we will explain the action of the photometry part 10. The electric charge that accumulates in the photoelectric elements Rij,Gij,Bij in each of the photometry regions is transferred to the corresponding horizontal transmission register H1–H13 upon the generation of an accumulation termination signal by whichever of the accumulation control parts 16,17 that corresponds to the photoelectric element. Further, the charge from areas with short accumulation times is stored in the transmission register until the accumulation of charge is terminated in areas with long accumulation times and the charge is transmitted to the transmission register.

When the charge accumulated in all of the photoelectric elements Rij,Gij,Bij has been transmitted to the horizontal transmission registers H1–H13, it is transmitted to the vertical register V1 one element at a time in accordance with a clock signal produced in the photometry part 10. The vertical register V1 transmits the charge to the A/D converter 11 via an output circuit (not shown in the diagram) in the photometry part 10 also in accordance with an internal clock.

By thus dividing the photometry part 10 into areas and controlling the accumulation time of the photoelectric elements in each area, it becomes possible, for instance in the case when the upper section of the subject field H is bright while the lower section is a darker scene, to bring the photometric output of the two areas within the range where photometry is possible and it also becomes possible to enlarge the dynamic photometry range by making the accumulation time of the photometry regions in the lower section longer than the accumulation times of the photometry regions in the upper section.

Figure 6:
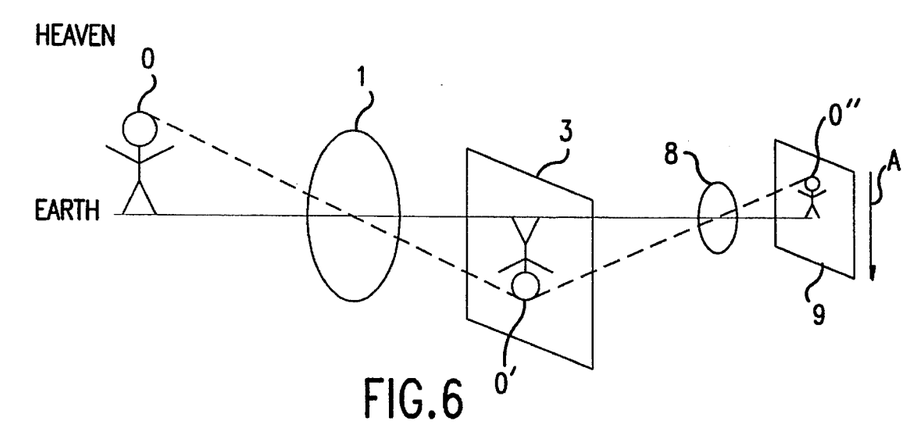
FIG. 6 is a diagram used to explain the direction of charge transmission.

We will further explain this point using FIG. 6. Suppose a subject 0 is present as shown in FIG. 6. Light rays passing through the photography lens 1 form an image of the subject 0' on the screen 3, and this image 0' is then projected onto the photometry element 9 through the photometry lens 8, thereby forming another image 0".

In this case, taking the direction of transmission in the vertical register V1 of the photometry part 10 to be in the direction of the arrow A, in other words from the top (upper side) to the bottom (lower side) with respect to the subject field H, because the charge from the elements in the relatively dark lower side are transmitted without passing through the relatively bright upper side when the charge is transmitted by the vertical register V1, it is possible to eliminate the smear phenomenon that occurs when the charge from the brighter sections of the screen flows into the photometric charge from the less bright sections.

Figure 7:
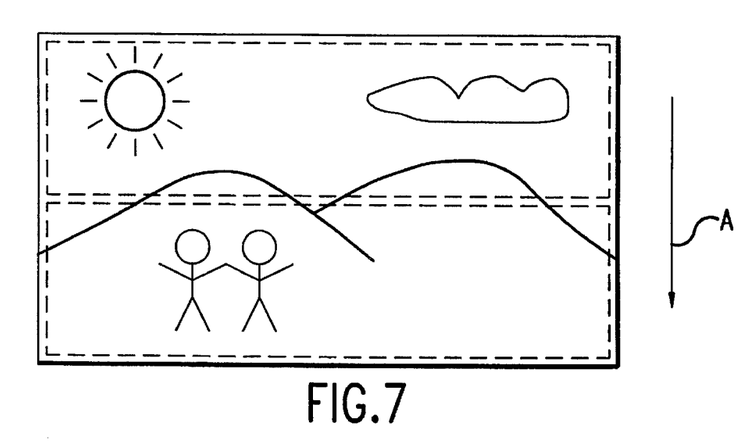
FIG. 7 is a diagram used to explain the direction of charge transmission.

That is to say, because it is common for bright regions such as the sky to be positioned in the upper part of the subject field H, such as is shown in FIG. 7, it is possible to eliminate the smear phenomenon because by having the direction of transmission be in the direction of arrow A from the upper side to the lower side, charge from the dark lower regions does not pass through the bright upper regions.

Figure 8:
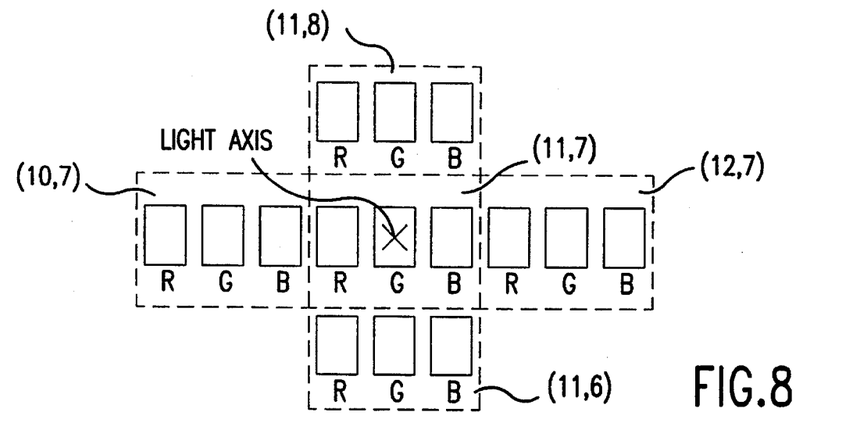
FIG. 8 is a diagram used to explain the positioning of the photoelectric elements.

Concerning the positioning of the photoelectric elements, the optical axis passes through the center of photoelectric element G11,7 used for green light in the photometry region numbered (11,7), as shown in FIG. 8. Because the transmission mechanism is located on the light receptor surface in accumulation-type photoelectric elements, the aperture ratio, which is the ratio of the photoelectric part to the light receiving area, unavoidably decreases. As a result, it becomes impossible to measure light from objects outside the photoelectric part. Because of the high probability that the major subject will be located on the optical axis on the photographic screen, it is vital that the photoelectric part be on the optical axis. In addition, when the pixels used to measure different color tones are lined up alternately, the pixel that measures the color green (G), which has a sensitive distribution nearest the visibility curve, must be located on the optical axis in order to improve the photometric accuracy.

Figure 9:
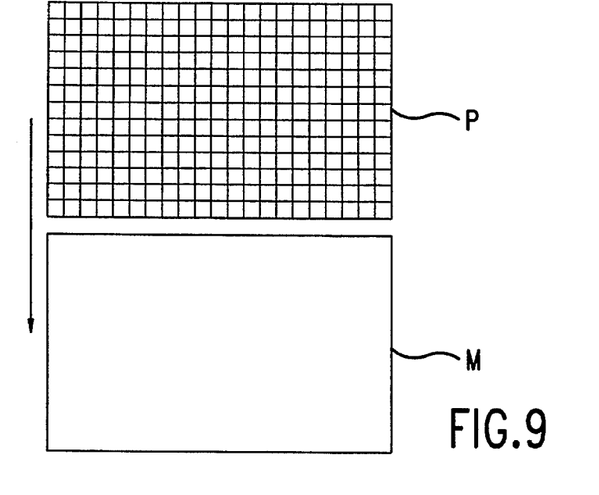
FIG. 9 is a configuration drawing showing a different embodiment of the photometry part.

As an alternative example of the photometry part 10, when a frame transfer format is used in which the photometry elements 9 are separated into light receptors P and accumulators M, as shown in FIG. 9, it is possible to eliminate the smear phenomenon by having the direction of charge transmission be from the upper side to the lower side because the charge is transmitted to the accumulators M via the light receptors P.

Figure 10:
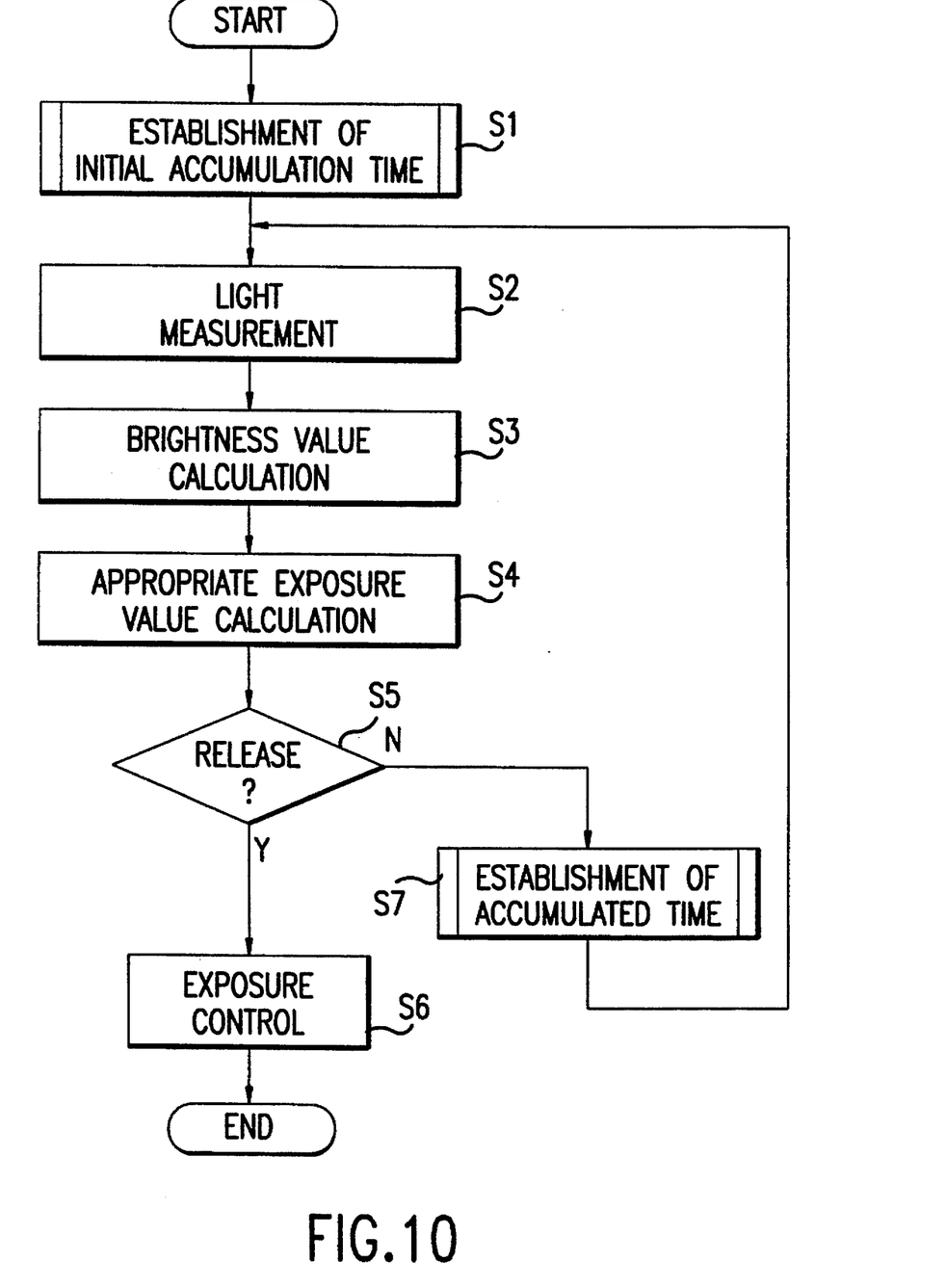
FIG. 10 is a flowchart used to explain the action of this invention.

Next, we will explain the action of the photometry system in the embodiment by referring to the flowchart shown in FIG. 10. The action is initiated by depressing the shutter button (not shown in the diagram) halfway.

First, the process of setting the initial accumulation time is executed (step S1). This process sets the initial accumulation time ta of the photoelectric elements Rij,Gij,Bij from the date and time of the photograph. Details of the process of step S1 be explained by referring to the flowchart shown in FIG. 11 at a later time.

Next, an accumulation of charge is executed in the first and second photometry areas 10a, 10b through the accumulation time ta which has been set, and the photometry value obtained as a voltage signal from each of the photometry regions is converted into a digital signal by the A/D converter 11 and output as digital photometry information (step S2).

Next, a brightness value is calculated by the brightness calculator 12 based on the digital photometry information, the accumulation time ta and information from the lens ROM 13 (step S3). The exposure calculator 14 then calculates the optimal exposure value based on the calculated brightness value (step S4). Because the method of calculating the optimal exposure value is explained in detail in the public disclosure of Japanese Laid-Open Publication No. 4-310930, which corresponds to U.S. patent application Ser. No. 07/831,201, the disclosure of which is incorporated by reference herein, a detailed explanation is omitted.

Next, the system determines whether the shutter button (not shown) has been depressed all the way (step S5). If it is depressed all the way, the exposure is controlled by the exposure controller 15 based on the optimal exposure value (step S6) and the process terminates. If the shutter button is not depressed all the way, the next accumulation time ta is set (step S7) and the process is repeated from step S2. The process involved in step S7 will be explained hereafter.

Figure 11:
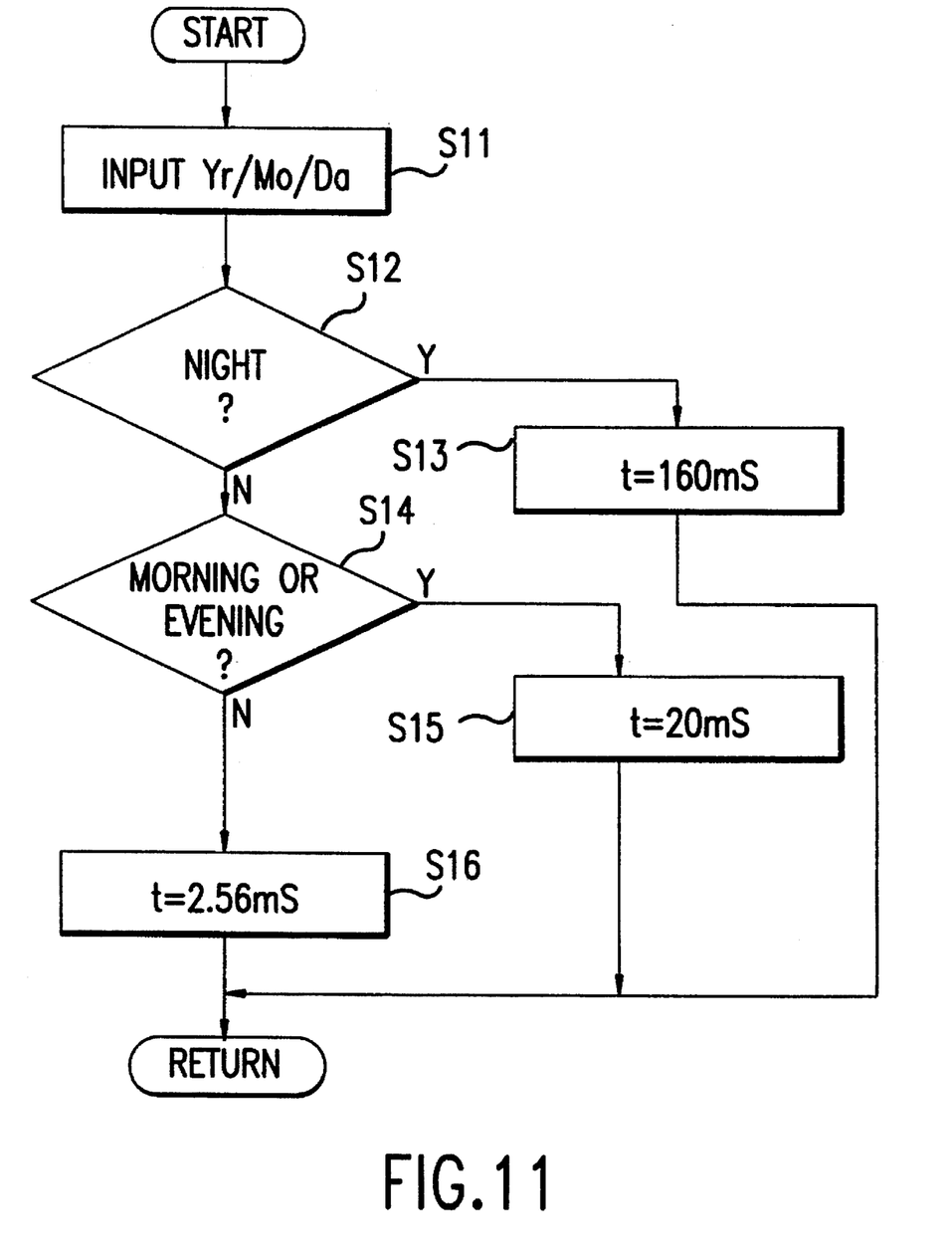
FIG. 11 is a flowchart showing the initial accumulation time setting process subroutine.

Next, we will explain the initial accumulation time setting process subroutine (of step S1) by referring to the flowchart shown in FIG. 11. The probable outdoor conditions are divided into the three categories of "daytime", "morning or evening" and "night" based on the current date and time information which is calculated by the clock mechanism 18 (step S11). First, it is determined whether night conditions are probable (step S12). If the determination is "night", the initial accumulation time ta is set at 160 ms (step S13). When a standard photometric optical system and photometry element are used, this corresponds to measuring light with a brightness of EV1.

If the determination is not "night" in step S12, the system determines whether "morning or evening" conditions are probable (step S14). If the determination is "morning or evening", the initial accumulation time ta is set at 20 ms (step S15). With the photometry system mentioned above, this corresponds to measuring light with a brightness of EV4.

If the determination is not "morning or evening" in step S14, the determination is "daytime", so the initial accumulation time ta is set at 2.56 ms (step S16). With the photometry system mentioned above, this corresponds to measuring light with a brightness of EV7.

Figure 12:
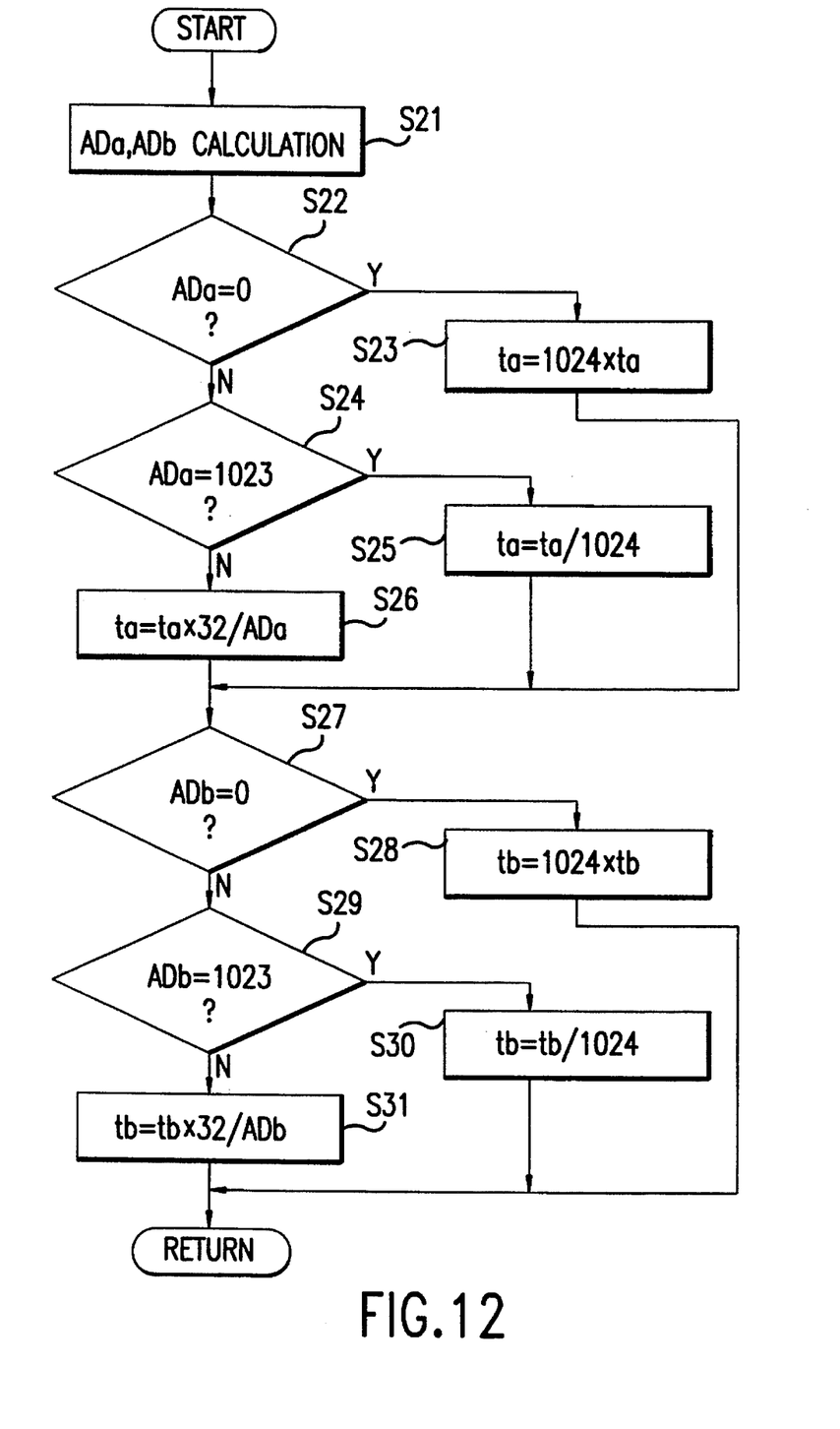
FIG. 12 is a flowchart showing the accumulation time setting process subroutine.

Next, we will explain the accumulation time setting process subroutine (of step S7) by referring to the flowchart shown in FIG. 12. First, average values ADa,ADb are calculated for the digital photometry information from each of the photometry regions in the first photometry area 10a and the second photometry area 10b (step S21). The average values ADa,ADb are 10 artilogrithms within the range 0–1,023. The values are the output of the A/D converter 11. The A/D converter 11 has a level of discrimination of 10 bits so there are 1024 values. In this application, minimal amounts of data are assigned a value of zero. Thus, the highest value is 1,023 and the range is 0–1,023. The minimal value is zero because it cannot be measured. If assigned the value 1, it could be read as one-half of the value 2. However, the value 1 is used to represent the minimum amount of measurable data.

Then, it is determined whether the average value ADa from the first photometry area 10a is zero (step S22). If the average value ADa is zero, the next accumulation time ta is set at 1,024 times the previous accumulation time ta (step S23). This is because data that was "1", that is, the minimum measurable amount of light, in the previous measurement of light in the next measurement becomes the value that just exceeds the maximum value "102338 and data less than or equal to this ends up within the photometry range, which is very convenient.

If it is determined in step S22 that the average value ADa is not zero, it is determined whether the average value ADa is the maximum measurable value "1,02338 , values above "1,023" being overflow values and represented by "1,023"(step S24). If it is determined that the value is the maximum value, the next accumulation time ta is set at $\frac{1}{1024}$ times the previous accumulation time (step S25). This is because data that overflowed, was in fact greater than the largest measurable value, in the previous light measurement becomes "1" the smallest or minimum measurable amount of light, in the next light measurement and data greater than or equal to this ends up within the photometry range, which is very convenient.

If it is determined that the average value ADa is not the maximum value, the next accumulation time ta is determined using the equation (step S26):

$$ta = ta \times 32/ADa \qquad (\text{eq.1})$$

Having done this, the setting of the next accumulation time ta for the first photometry area 10a is concluded.

Figure 13:
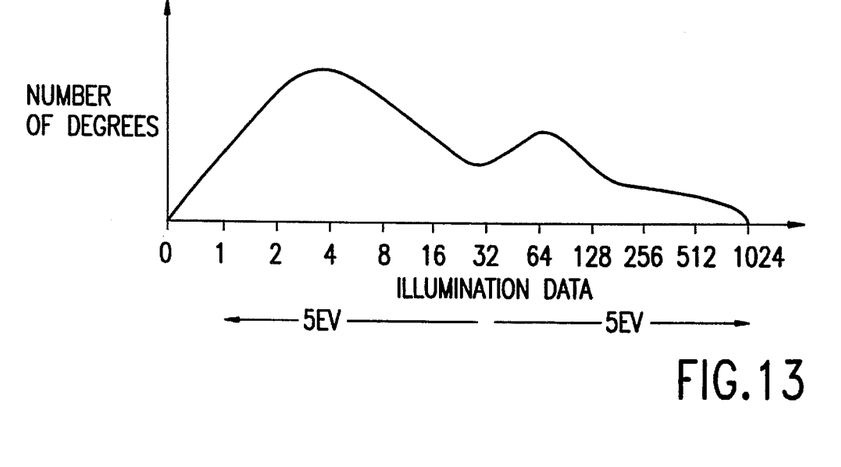
FIG. 13 is a drawing to explain the accumulation time setting.

We will now discuss the method of setting the accumulation time by referring to FIG. 13. The graph of FIG. 13 shows the value of the digital photometry information on the horizontal axis with the frequency (number) of photometry information in all of the photometry regions in the first photometry area 10a shown on the vertical axis.

In the graph, when the average value ADa of the photometry information is "16" for instance, the next accumulation time ta determined from equation 1 becomes double the previous accumulation time ta and, if the condition of the subject does not change, the next average value ADa will be "32." In addition, when the average value ADa is "64" the next accumulation time ta determined from equation 1 becomes one-half the previous accumulation time ta and, if the condition of the subject does not change, the next average value ADa will be "32." That is to say, if the brightness of the subject does not change, the next average value will be "32." This is because the brightness value is expressed as a logarithm, so when the average value is "32" in the range from "0" to "1023", the photometry range can be secured with exactly 5 EV both up and down.

When the setting of the next accumulation time ta in the first photometry area 10a is concluded, the next accumulation time tb in the second photometry area 10b is set. Because the method of setting the accumulation time tb is the same as the method of setting the accumulation time ta discussed above, a detailed explanation is omitted here, but first, it is determined whether the average value ADb from the second photometry area 10b is zero (step S27), and if ADb=0, the next accumulation time tb is set at 1024 times the previous accumulation time (step S28).

If the average value ADb is not zero, it is determined whether or not the average value (ADb) is the maximum value "1,023"(step S29) and if it is the maximum value, the next accumulation time tb is set at $1/1024$ times the previous accumulation time (step S30). If it is determined that the average value ADb is not the maximum value, the next accumulation time tb is found using the following equation (step S31):

$$i\ tb=tb\times 32/ADb \qquad (eq.2)$$

Having done this, the setting of the next accumulation time tb for the second photometry area 10b is concluded.

Using this invention, it becomes possible, in a photometry system equipped with accumulation-type photometry elements, to eliminate the smear phenomenon that results from the effects of the bright regions of the subject field, and it also becomes possible to appropriately measure light from the major subject in the subject field and to obtain correct photometry values with few errors.

What is claimed is:

1. A camera including a photometry system for avoiding the problem of smear phenomenon, comprising:

a photometry part defining a subject field and divided into a first photometry area in a first portion of said photometry part and a second photometry area in a a second portion of said photometry part, said photometry part being positioned in said camera so that said first photometry area receives an image of an object area that is higher throughout than the object area for which said second photometry area receives an image when the camera is held in a normal horizontal photographing position with the image field in the horizontal direction exceeding the image field in the vertical direction;

a plurality of photometry regions each comprising accumulation-type photoelectric elements in each of said first and second photometry areas;

a photoelectric mechanism for converting light received by each of said accumulation-type photoelectric elements in said first photometry area and said second photometry area of said photometry part into electrical charges and storing the electrical charges;

a transmission mechanism for transmitting the electrical charges representing the received light; and a brightness value calculator for calculating a brightness value using the transmitted electrical charges.

2. The camera as claimed in claim 1, wherein said photometry part is positioned on the optical axis of the photometry system.

3. The camera as claimed in claim 2, wherein each of the plurality of photometry regions has an accumulation-type photometry element for each of a plurality of hues thereby measuring the light by dividing a subject field into the plurality of hues.

4. The camera photometry system as claimed in claim 3, wherein an accumulation-type for a hue, of the plurality of hues, having a spectral sensitivity nearest a human visibility curve is positioned on the optical axis of the photometry system.

5. The camera as claimed in claim 3, wherein each of the plurality of photometry regions has accumulation-type photometry elements for red, green and blue light.

6. The camera claimed in claim 1, wherein said accumulation-type photoelectric elements are arranged in columns and rows and said transmission mechanism comprises at least one horizontal transmission register for each of said first photometry area and said second photometry area and at least one vertical transmission register.

7. The camera as claimed in claim 6, comprising a horizontal transmission register for each row of said accumulation-type photoelectric members.

8. The camera as claimed in claim 7, wherein said horizontal transmission registers of said first photometry area and of said second photometry area are respectively connected in parallel to a single vertical transmission register.

* * * * *